(12) United States Patent
Simpson et al.

(10) Patent No.: US 11,009,456 B2
(45) Date of Patent: May 18, 2021

(54) METHOD OF PHASE CONTRASTING

(71) Applicant: Purdue Research Foundation, West Lafayette, IN (US)

(72) Inventors: Garth Jason Simpson, Lafayette, IN (US); Fengyuan Deng, Watertown, MA (US); Changqin Ding, West Lafayette, IN (US); Chen Li, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 72 days.

(21) Appl. No.: 16/560,949

(22) Filed: Sep. 4, 2019

(65) Prior Publication Data

US 2020/0072745 A1 Mar. 5, 2020

Related U.S. Application Data

(60) Provisional application No. 62/726,970, filed on Sep. 4, 2018.

(51) Int. Cl.
*G01B 9/02* (2006.01)
*G01N 21/45* (2006.01)
*G02B 5/30* (2006.01)

(52) U.S. Cl.
CPC ........... *G01N 21/45* (2013.01); *G02B 5/3016* (2013.01); *G01N 2201/0633* (2013.01)

(58) Field of Classification Search
CPC ................ G02B 5/3016; G02B 5/3083; G02B 21/0056; G02B 21/0092; G02B 21/14; G01N 2201/0633; G01B 9/02057; G01B 11/2441; G01B 2290/70
See application file for complete search history.

(56) References Cited

U.S. PATENT DOCUMENTS

| 9,360,423 | B2 * | 6/2016 | Yu | G03H 1/0005 |
|---|---|---|---|---|
| 2005/0167578 | A1 * | 8/2005 | Riza | G01N 21/23 250/234 |
| 2010/0284065 | A1 * | 11/2010 | Matsui | G02B 21/14 359/370 |
| 2016/0259158 | A1 * | 9/2016 | Girshovitz | G01J 9/0215 |
| 2017/0059299 | A1 * | 3/2017 | Safrani | G02B 21/26 |
| 2017/0242398 | A1 * | 8/2017 | Brooker | G02B 1/02 |
| 2019/0250104 | A1 * | 8/2019 | Matoba | G02B 21/16 |

\* cited by examiner

*Primary Examiner* — Tarifur R Chowdhury
*Assistant Examiner* — Jonathon Cook
(74) *Attorney, Agent, or Firm* — Purdue Research Foundation; Aman Talwar

(57) ABSTRACT

A system including a first micro-retarder array, wherein the first micro-retarder array is configured to convert a purely polarized light of an incident light into two components. The system additionally includes an optical device, wherein the optical device is configured to collimate the two components to two foci planes. Moreover, the system includes a second micro-retarder array, wherein the second micro-retarder array is configured to combine a set of two components of the incident light, thereby producing a second purely polarized light. Further the system includes a detector, wherein the detector is configured to receive the second purely polarized light.

20 Claims, 7 Drawing Sheets

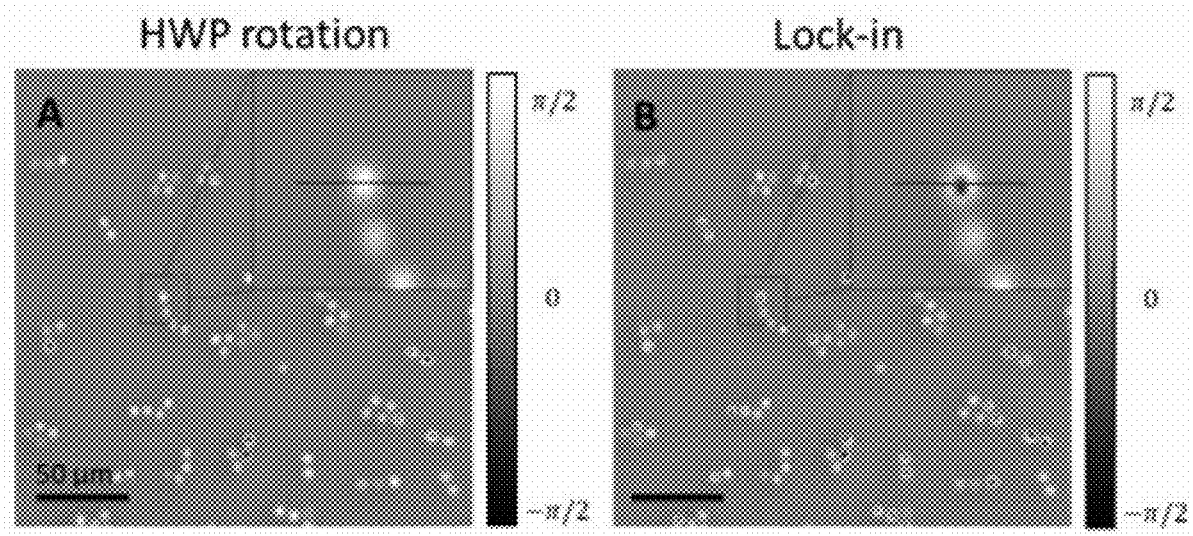
Figure 8(a)
Figure 8(b)
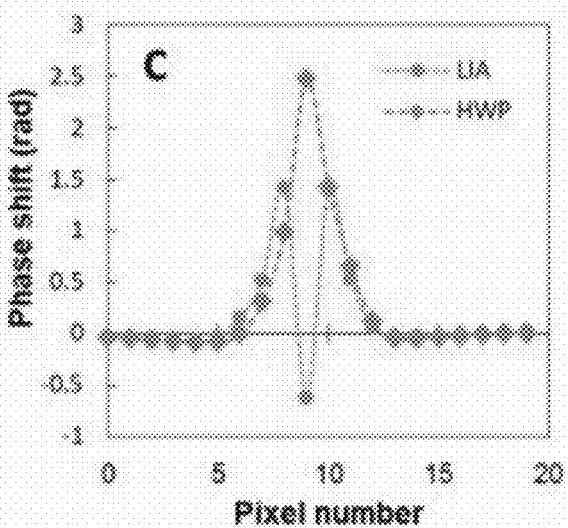
Figure 8(c)
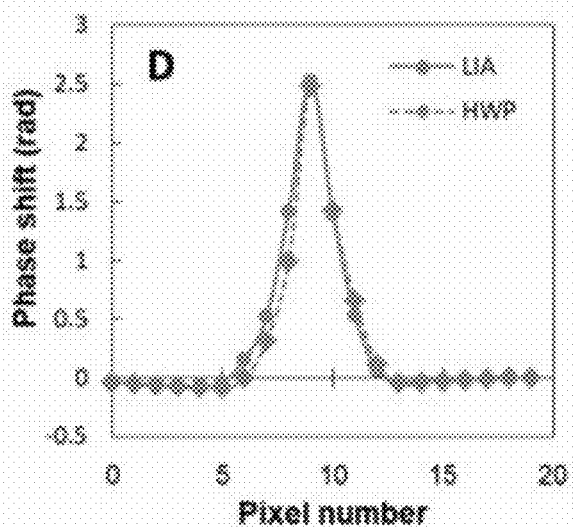
Figure 8(d)

METHOD OF PHASE CONTRASTING

CROSS-REFERENCE TO RELATED APPLICATIONS

The present U.S. Patent Applications is related to and claims the priority benefit of U.S. Provisional Patent Application Ser. No. 62/726,970, filed Sep. 4, 2018, the contents of which is hereby incorporated by reference in its entirety into this disclosure.

This invention was made with government support under GM-103401 and GM-103910 awarded by National Institutes of Health. The government has certain rights in the invention.

BACKGROUND

This section introduces aspects that may help facilitate a better understanding of the disclosure. Accordingly, these statements are to be read in this light and are not to be understood as admissions about what is or is not prior art.

Optical microscopy has enabled numerous discoveries by visualizing specimen of interests in biological and materials sciences ever since its invention in 17th century. Despite various unseen microscopic species being studied, it remains a challenge to generate intrinsic contrast from optically thin specimens including living cells, unstained tissues or 2D nanomaterials, due to the weak absorption and scattering from samples. Zernike first tackled this problem by inventing phase contrast microscopy which reveals the intrinsic phase contrast from transparent structures without staining or tagging utilizing light interference. But the side-lighting nonuniformity and halo-effects complicate the qualitative analysis. Nomarski further developed differential interference contrast (DIC) microscopy, in which linearly polarized light is split to a pair of orthogonal polarized light and focused at either the object or an adjacent reference point, with reduced halos and enhanced contrast.

Unfortunately, both approaches only generate intensity distribution where the phase and amplitude information are nonlinearly entangled and cannot be quantitatively retrieved. Thus, Gabor suggested the use of interferogram information to quantitatively recover the complex optical field, which leads to the modern quantitative phase imaging, in which a beam is split and recombined at an angle such that the focal plane array records an interferogram. Image reconstruction is performed afterwards for phase retrieval. Based on the same physical principles, many other interferometric QPI approaches were developed recently. Although the above-mentioned QPI methods can provide quantitative phase information with high precision, these interferometric approaches face the common problem of high sensitivity to environmental perturbations (such as mechanical vibrations and temperature changes) since the reference beam does not pass through the same optic path of the light coming from the object. In addition, the requirement of reference beam increases the complexity of these QPI systems making them incompatible with retrofitting into existing microscopy systems (i.e., requires a special-purpose module). Furthermore, the images are inherently underdetermined; both phase and intensity must be inferred by image reconstruction rather than directly and independently measured at each pixel. As an alternative, there are a group of non-interferometric approaches such as Fourier ptychography or coherent diffraction imaging that can recover the phase information without a reference beam. However, these above-mentioned methods are based on assumptions on the beam passing through the object and mathematically inferred reference wavefront, which makes both the image acquisition and the post-processing highly time consuming.

SUMMARY

A versatile and simple QPI approach that is compatible to popular advanced optical microscopes used in modern biological and biomedical studies is desired. In the present application, axially-offset differential interference contrast (ADIC) microscopy for QPI is developed via polarization wavefront shaping using a matched pair of micro-retarder arrays (μRAs). The μRA is a lab designed optic with radially distributed patterns that can introduce half-wave retardance with the azimuthal orientation of the fast-axis varying spatially at different positions. After passing through the μRA, the wavefront of linearly polarized incident light is identical to that produced by the interference between a slightly diverging right circularly polarized (RCP) plane wave and a slightly converging left circularly polarized (LCP) plane wave. After focused with objective, two foci with axially offset of 70 μm are generated with orthogonally polarized component, serving as sample plane and reference plane. Two strategies, including half wave plate (HWP) rotation and lock-in amplified detection are adopted in ADIC microscopy for simultaneous quantitative phase image and transmittance image retrieval. The recovered QPI agreed well between the two strategies with a phase change range from $-\pi/2$ to $\pi/2$ and a detection limit of 0.05 in the unit of rad. Silica beads sized 8 μm has been used to investigate phase wrapping in the quantitative phase shift analysis. Quantitative phase shift images in tissue section samples had been measured by using ADIC microscopy. This approach is potentially compatible with broad classes of microscopic techniques including bright field microscopy, nonlinear multimodal microscopy, and photothermal microscopy.

Linearly polarized light can be viewed as a coherent combination of RCP and LCP light. The plane of polarization ($\Upsilon$) can be defined by the phase difference between the right and left contributions. When the plane of polarization is with half wave retardance, the phase delays for right and left circular polarized contributions are $2\Upsilon$ and $-2\Upsilon$ separately as shown in Eq. (1). The overlay of converging right circular and diverging left circularly polarized beams produces linearly polarized light with the axis of polarization rotated in a radial pattern as shown in FIG. 1A, which has similarities to a Fresnel zone plate. Designing a μRA to produce this pattern for a linearly polarized incident beam therefore generates diverging and converging components, which can be recombined using a paired μRA in transmission.

$$e^{-i\frac{\pi}{2}} \cdot \begin{pmatrix} \cos(2\Upsilon) \\ \sin(2\Upsilon) \end{pmatrix} = e^{-i\cdot 2\Upsilon} \cdot \begin{pmatrix} 1 \\ i \end{pmatrix} + e^{-i\cdot(-2\Upsilon)} \cdot \begin{pmatrix} 1 \\ -i \end{pmatrix} \qquad (1)$$

In this application, μRA incorporate birefringent liquid crystal plates was designed with the pattern of half-wave retardance at every position varying spatially in the azimuthal orientation of the fast-axis with a 60 μm×60 μm pixel size per entry and an active radius of 12 mm. The designed μRA targets for 532 nm light. Unlike the Nomarski microscopy in which the split beams are focused at two adjacent positions within the sample plane (SP) in order to generate phase contrast (FIG. 1B), the decomposed converging LCP and diverging RCP light after the μRA will be focused with an axially-offset after the same objective, such that the reference beam is defocused within the sample plane (FIG. 1C). The axially offsetting the two focus planes allows the use of a homogeneous medium (e.g, glass, solvent, air) as a reference. In the absence of a sample, a paired identical µRA in transmittance coherently recombines the two orthogonal components to recover a plane wave with the original polarization state of the incident light. When detecting at the crossed-polarization direction of the incident light, signals arise from phase-shifts between the sample and reference planes. When modulating the polarization states of the linear polarized incident light, lock-in amplifier (LIA) detection is available for this system to take advantage of the high signal-to-noise ratio for fast quantitative phase imaging.

One aspect of the present application relates to a method for phase contrasting, wherein the method includes converting a purely polarized light of an incident light into two orthogonal components, wherein the two orthogonal components includes a first purely polarized divergent component and a second purely polarized convergent component. The first purely polarized divergent component is orthogonal to the second purely polarized convergent component. The method additionally includes focusing each of the first purely polarized divergent component and the second purely polarized convergent component into a focal plane, thereby producing axially offset two foci planes. Furthermore, the method includes placing a first portion of a sample at one focus plane of the two foci planes. Additionally, the method includes combining a phase altered purely polarized light component with a phase unaltered purely polarized light component to form a second purely polarized light, wherein the phase altered purely polarized light component includes a first phase shifted divergent purely polarized light component or a second phase shifted convergent purely polarized light component. The first phase shifted divergent purely polarized light component is orthogonal to the second phase shifted convergent purely polarized light component. Moreover, the method includes detecting the second purely polarized light by a channeled detector. Furthermore, the method includes calculating a first phase change of the first portion of the sample from the second purely polarized light.

Another aspect of the present application relates to a system including a first micro-retarder array, wherein the first micro-retarder array is configured to convert a purely polarized light of an incident light into two components. The system additionally includes an optical device, wherein the optical device is configured to collimate the two components to two foci planes. Moreover, the system includes a second micro-retarder array, wherein the second micro-retarder array is configured to combine a set of two components of the incident light, thereby producing a second purely polarized light. Further the system includes a detector, wherein the detector is configured to receive the second purely polarized light.

BRIEF DESCRIPTION OF THE DRAWINGS

One or more embodiments are illustrated by way of example, and not by limitation, in the figures of the accompanying drawings, wherein elements having the same reference numeral designations represent like elements throughout. It is emphasized that, in accordance with standard practice in the industry, various features may not be drawn to scale and are used for illustration purposes only. In fact, the dimensions of the various features in the drawings may be arbitrarily increased or reduced for clarity of discussion.

FIG. 8(a) illustrates a quantitative phase contrast image recovered from HQP rotation method of a single FoV of 8 µm silica beads in nail polish. FIG. 8(b) illustrates a quantitative phase contrast image recovered from LIA detection method of a single FoV of 8 µm silica beads in nail polish. FIG. 8(c) illustrates overlay phase shift plots along the cross line for HQP rotation method and LIA detection. FIG. 8(d) illustrates overlay phase shift plots after phase wrapping correction.

DETAILED DESCRIPTION

The following disclosure provides many different embodiments, or examples, for implementing different features of the present application. Specific examples of components and arrangements are described below to simplify the present disclosure. These are examples and are not intended to be limiting. The making and using of illustrative embodiments are discussed in detail below. It should be appreciated, however, that the disclosure provides many applicable concepts that can be embodied in a wide variety of specific contexts. In at least some embodiments, one or more embodiment(s) detailed herein and/or variations thereof are combinable with one or more embodiment(s) herein and/or variations thereof.

Figure 1A:
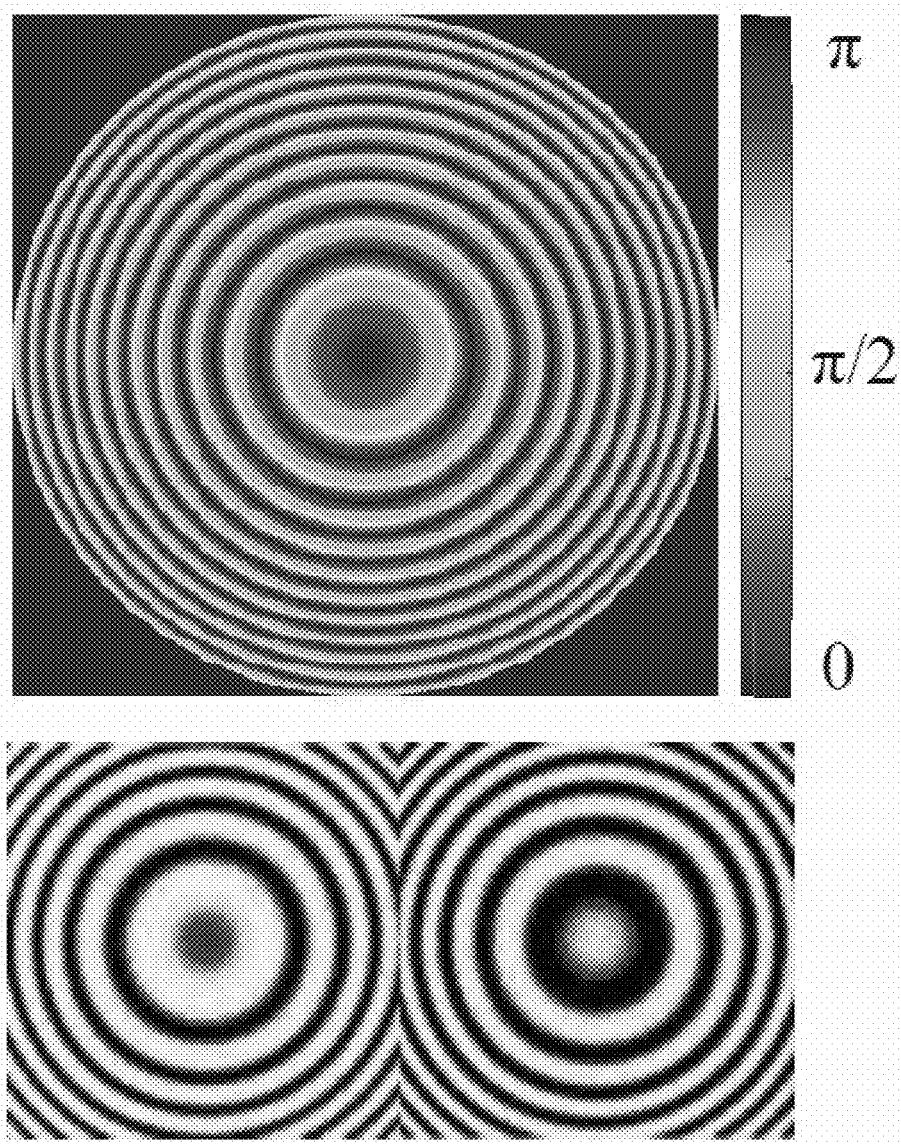
FIG. 1(a) illustrates a design of µRA as half-wave retardance with spatially varied azimuthal orientation of the fast-axis targeted for 532 nm light.
Figure 1B:
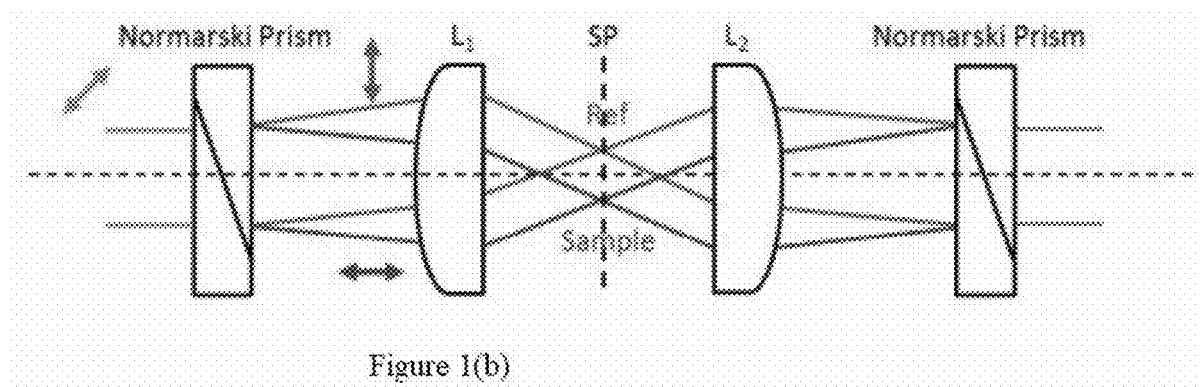
FIG. 1(b) illustrates a working principle of a phase-contrast microscope.
Figure 1C:
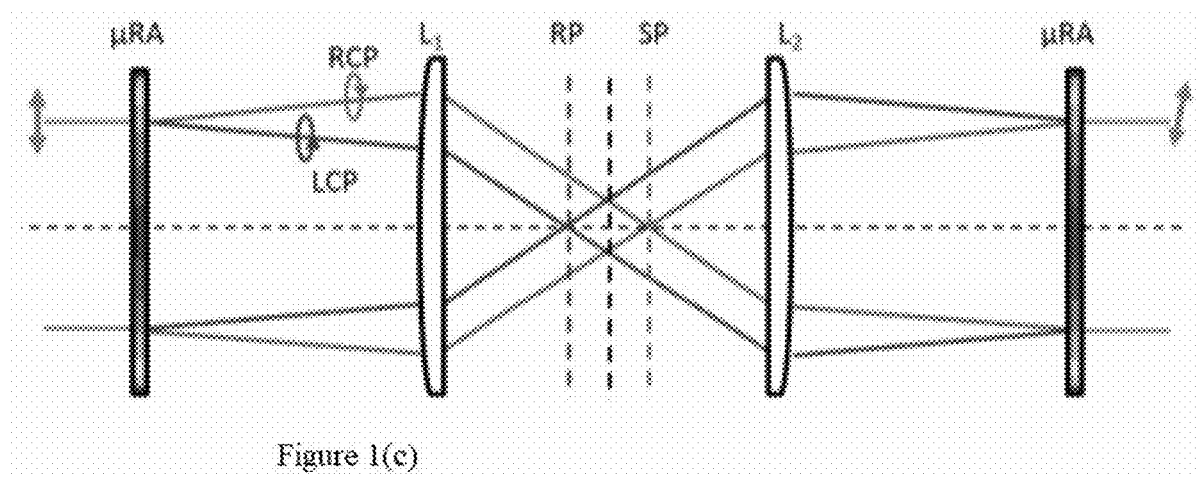
FIG. 1(c) illustrates a working principle of ADC microscope.
Figure 2:
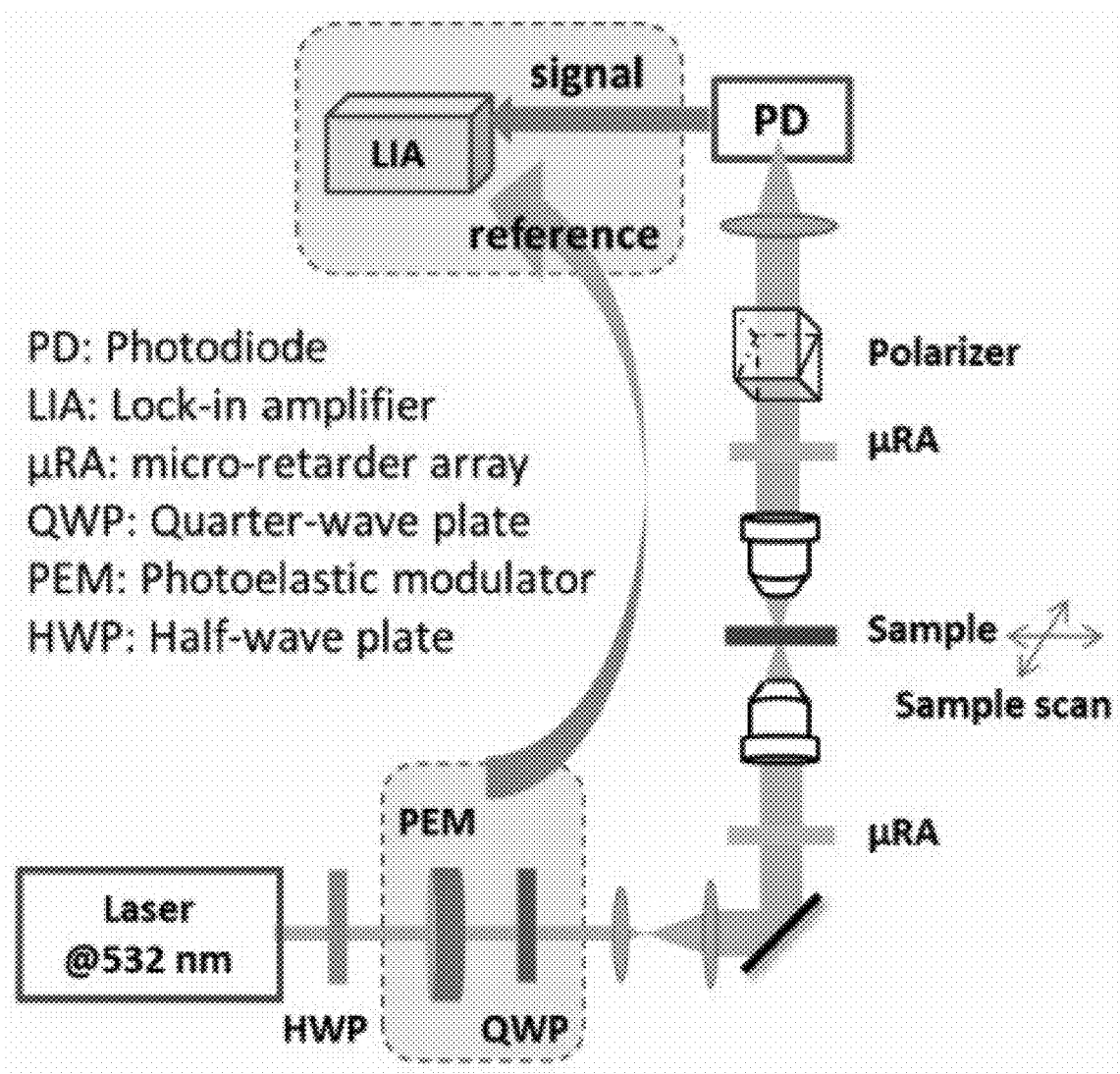
FIG. 2 illustrates an experiment set-up for QPI with a 10× objective to recover both bright field images and quantitative phase contrast images.

Axially-offset Differential Interference Contrast Microscopy (ADIC) microscope was constructed based on a bright field microscope frame with the addition of several polarizing optics, as illustrated in FIG. 2. In brief, a 532 nm continuous laser (Millenia Vs J) was used for illumination, followed with a half wave plate (HWP) inserted in a rotation stage for linearly polarization modulation of the incident light. The beam was expanded to 15 mm in diameter so that it filled about half area of a μRA and the full aperture of a 10× objective (Nikon). The average laser power on the sample was around 5 mW. An identical 10× objective was used as condenser in transmittance to recover the expanded beam size so that wave front was recovered to the same polarization states as the incident light after the paired μRA. A sample scanning stage (Mad city labs Nano-Bio300) was driven by two phase-locked function generators (Tektronix AFG2021 and Agilent 33220A) for image acquirement with a frame rate of 20 s. By varying the modulation amplitude of the two function generators, the size of one field of view (FoV) was controlled as 250 μm×250 μm. A photodiode (Thorlabs DET-10A) was used as the detector with a polarizer (DPP-25B, Thorlabs) in front to pass the horizontal polarized light. Signals from the photodiode were digitized at 20 kHz using a PCI-E digitizer oscilloscope cards (AlazarTech ATS-9462) and remapped into 200×200 images via custom software (MATLAB). Polarization modulation measurements were conducted via mechanical rotation of the HWP from 0 to 90 degrees with 3 degree intervals. For the fast polarization modulation coupled with LIA (Stanford Research Systems SR810) detection, a photoelastic modulator (PEM Hinds instrument PEM-90M) followed with a quarter wave plate (QWP) were installed into the beam path between the HWP and the beam expansion. The fast axis of the HWP and QWP were rotated to 22.5° and 45° respectively, to make sure that the incident light became rapidly modulated linearly polarized light before entering the μRA. The PEM was operating at 50 kHz, with both 1f (50 kHz) and 2f (100 kHz) outputs delivered as the reference signals to the LIA. Both the quadrature and in-phase components of the LIA output were acquired simultaneously. The integration time for LIA was set as 30 μs.

A series of masks with varied thickness were made through photolithography resources within the Birck Nanotechnology Center at Purdue University. Silica beads sized in diameter of 8 μm were used. For quantitative phase imaging, the silica beads were dispersed in nail polish sonically before sealed between cover slip and a glass slide. Mouse tail sections were used as well. Mouse tails were first decalcified in the solution of 23% formic acid, 4% formalin, and 1% methanol for 2 hours, followed by sectioning longitudinally to ensure that sections were retrieved from the central region of the tail. The mouse tail section was then fixed in 10% formalin and embedded in paraffin prior to microtoming into 4 μm thick slides. After sectioning, the mouse tail was stained by hematoxylin and eosin.

The Jones vector describing the detected signal after the sample can be expressed through the Eq (2) as a sum of changes from the two foci. In Eq. (2), $t_1$ and $t_2$ are sample transmittances from the two foci separately. $\delta$ is the phase change induced by the sample, with opposite signs for RCP and LCP focus planes (sample and reference planes).

$$\overline{e^{det}} = \frac{1}{2}\left(t_1 \cdot \begin{bmatrix} 1 & i \\ i & 1 \end{bmatrix} \cdot e^{i\frac{\delta}{2}} + t_2 \cdot \begin{bmatrix} 1 & -i \\ -i & 1 \end{bmatrix} \cdot e^{-i\frac{\delta}{2}}\right) \cdot \overline{e^0} \quad (2)$$

When a half wave plate is inserted to change the incident polarization states, the intensity detected through a polarizer at horizontal polarization state is given by the Eq. (3), in which γ is the rotated angle of half wave plate. The transmittance from the sample is recovered as $(t_1+t_2)^2$.

$$I(\gamma) \propto t_1^2 + t_2^2 + 2t_1 t_2 \cdot \cos(\delta + 4\gamma) \quad (3)$$

For the LIA detection, PEM and QWP were placed between HWP and beam expansion, the past axis of HWP and QWP were rotated to 22.5° and 45° separately. The detected signal intensity after a polarizer at horizontal polarization state can be written as Eq. (4). As shown in Eq. (5), Δ is the retardance modulation introduced by the PEM as a function of time (τ) with modulation amplitude of 2 A. The retardance modulation frequency for PEM was f=50 kHz.

$$I(\tau) \propto 2(t_1^2 + t_2^2) + 2t_1 t_2 \cdot \sin(\Delta(\tau) - \delta) \quad (4)$$

$$\Delta(\tau) = 2A \cdot \sin(2\pi f \tau) \quad (5)$$

When A is relatively small, the Taylor expansion of Eq. (4) is shown as Eq. (6) with the first seven power series, corresponding to the first four harmonics of the LIA detection. The approximation in Eq. (6) will result in negligible errors for the PEM modulation as long as A<π/2. In our experiments, the modulation amplitude of the PEM was set as A=0.3π.

$$I(\tau) \propto 2(t_1^2 + t_2^2) + \quad (6)$$

$$2t_1 t_2 \cdot \left\{ \begin{array}{l} \left[\left(2A - A^3 + \frac{A^5}{6} - \frac{A^7}{72} + \ldots\right) \cdot \sin(2\pi f\tau) + \right. \\ \left. \left(\frac{A^3}{3} - \frac{A^5}{12} + \frac{A^7}{120} + \ldots\right) \cdot \sin(3 \cdot 2\pi f\tau) + \ldots \right] * \cos\delta \\ -\left[\left(1 - A^2 + \frac{A^4}{4} - \frac{A^6}{36} + \ldots\right) + \left(A^2 - \frac{A^4}{3} + \frac{A^6}{24} + \ldots\right) \cdot \right. \\ \left. \cos(2 \cdot 2\pi f\tau) + \left(\frac{A^4}{12} - \frac{A^6}{60} + \ldots\right) \cdot \cos(4 \cdot 2\pi f\tau) + \ldots \right] \cdot \sin\delta \end{array} \right\}$$

According to Eq. (6), quadrature components (sin) only exist for odd harmonic elements while in-phase components (cos) only exist for even harmonic elements of the Taylor series. The quadrature components (sin) of the first harmonic (1f) and the in-phase components (cos) of the second harmonic (2f) LIA detection are written as Eq. (7) and Eq. (8), respectively.

$$1f\_\sin \approx 2t_1 t_2 \cdot \left(2A - A^3 + \frac{A^5}{6} - \frac{A^7}{72}\right) \cdot \cos\delta \quad (7)$$

-continued $$2f\_cos \approx 2t_1t_2 \cdot \left(A^2 - \frac{A^4}{3} + \frac{A^6}{24}\right) \cdot \sin\delta \quad (8)$$

Combining Eq. (7) and Eq. (8) will result in the quantitative phase shift retrieval function shown below.

$$\tan\delta \approx \frac{2f\_cos}{1f\_sin} \cdot \frac{\left(2A - A^3 + \frac{1}{6}A^3 - \frac{1}{72}A^7\right)}{\left(A^2 - \frac{1}{3}A^4 + \frac{1}{24}A^6\right)} \quad (9)$$

Unlike the HWP rotation strategy, the transmittance image recovered from the LIA detection is defined as $t_1t_2$ instead of $(t_1+t_2)^2$ since no DC components were collected from the LIA detection. It is noteworthy that the HWP rotation strategy can recover phase value in the range of $[-\pi,\pi)$ while the LIA detection can only retrieve phase shift in the range of $(-\pi/2,\pi/2)$ due to the limitation of inverse tangent.

Figure 3A:
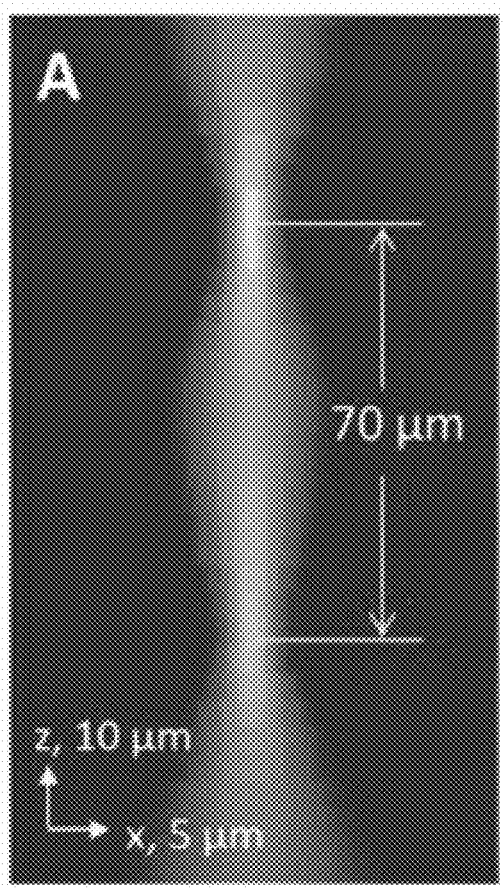
FIG. 3(a) illustrates measured point spread functions in the x-z plane with the µRA installed in the beam path.
Figure 3B:
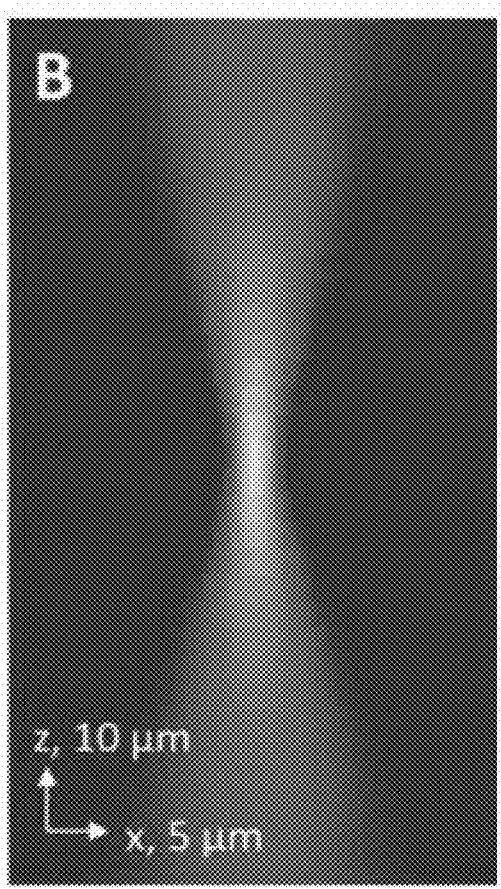
FIG. 3(b) illustrates measured point spread functions in the x-z plane without the µRA installed in the beam path.

We first performed 3D raster scans of a 1951 USAF resolution test chart to demonstrate the ability of the μRA to generate two axially-offset foci once installed in an optical microscope. Comparing to the result obtained from the bright field microscope, the 3D image stack acquired with the μRA shows two crisp images corresponding to the axially-offset dual-foci among slightly blurred images at the rest planes, as illustrated in FIG. 3A and FIG. 3B. To quantify the offset between the two foci, point spread functions in the x-z plane were derived from sharp edge response of the same test chart stripe using the 3D image stacks measured with and without the μRA. As shown in FIG. 3A, the two foci generated by the wavefront shaping of the μRA separate by 70 μm from each other and are symmetrically distributed to the original focus when there was not μRA in the beam path (FIG. 3B). This separation distance agrees well with the calculated value from the Fresnel zone plate based on the design of our μRAs. Meanwhile, the cross-section of the dual-foci remain unchanged comparing to that of the original focus indicating the same lateral resolution, which is about 2 μm measured in FIG. 3A. The introduction of the large spatial offset between the two foci (roughly ¼ of the 250 μm×250 μm FoV) makes it possible to create a stable and uniform reference plane, and place the reference plane in a homogeneous medium (e.g., glass, air, or solution), such that the imaging artifacts that are often encountered in Nomarski and Zernike phase contrast microscopy could be diminished.

Figure 4A:
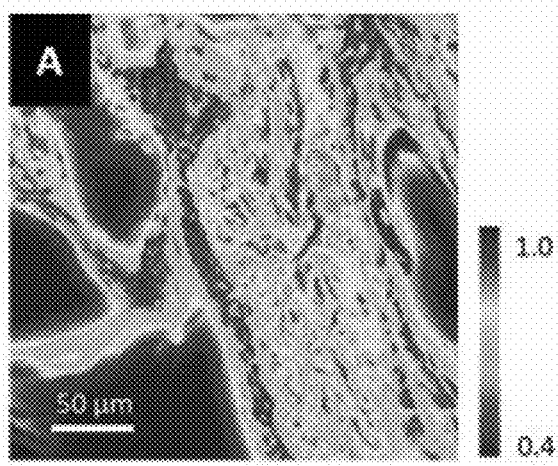
FIG. 4(a) illustrates transmittance image recovered with half wave rotation measurement of a single FoV of mouse tail section.
Figure 4B:
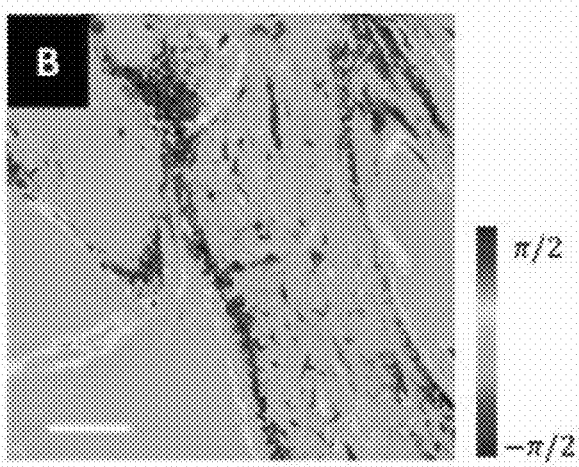
FIG. 4(b) illustrates quantitative phase contrast image recovered with half wave rotation measurement of a single FoV of mouse tail section.
Figure 4C:
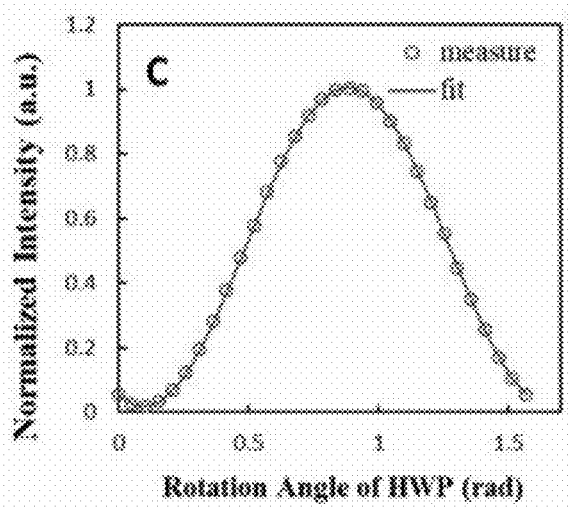
FIG. 4(c) illustrates overlay of the measured intensity of background (dots) with its nonlinear fit result (solid line).
Figure 4D:
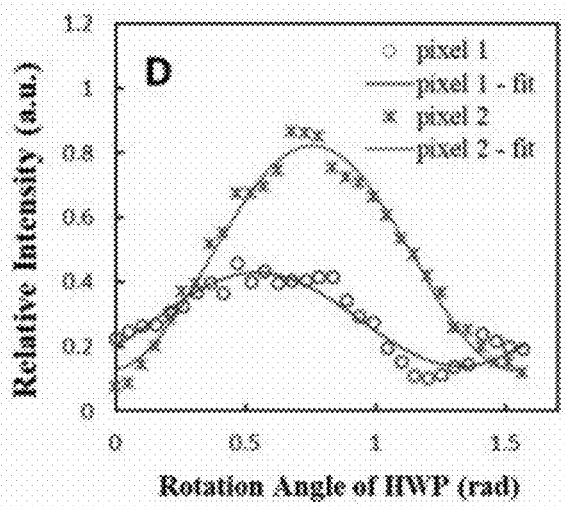
FIG. 4(d) illustrates overlay of the measured intensity of random pixels (dots) with its nonlinear fit result (solid line) to recover transmittance image and phase contrast image.

To retrieve the quantitative phase contrast images from ADIC imaging using the HWP rotation strategy, we measured a whole set of images with the HWP rotating through a 90-degree range while PD detecting at the horizontal orientation. The rotation interval was set as 3 degree such that 30 γ-x-y images were obtained prior to the phase retrieval process. Then the pixel-by-pixel nonlinear fit was applied to the intensity trace as a function of γ on each pixel referring to Eq. (3). The quantitative phase images were retrieved as the δ map while the transmittance images were recovered as $(t_1+t_2)^2$. FIG. 4A and FIG. 4B showed the recovered transmittance image and quantitative phase contrast image from a stained mouse tail section. The color map of FIG. 4B had been set in a range of $[-\pi/2,\pi/2]$ for better contrast though the original data were distributed in a range of $[-\pi, \pi)$ as mentioned in the above paragraphs. The areas with larger phase shift (red and blue area in FIG. 4B) depicted the detailed spatial distribution of the fibrils in mouse tail tissues whose intensity were relatively low in the retrieved transmittance image. The intensity trace of blank (no sample) areas in the raw ADIC image was used as the auto calibration that was fitted to Eq. (3) as shown in FIG. 4C. The measured intensity trace and fitted results show excellent agreement with each other indicating descent accuracy and precision of such calibration strategy. The slight offset between the minimum of the intensity trace and the origin was due to the non-perfect alignment of the polarization dependent optics in the beam path including μRAs and polarizers. Representative fittings for quantitative phase retrieval of two random pixels in the image were shown in FIG. 4D, with good agreement between the measurements (dots and stars) and fitting (lines).

Figure 5A:
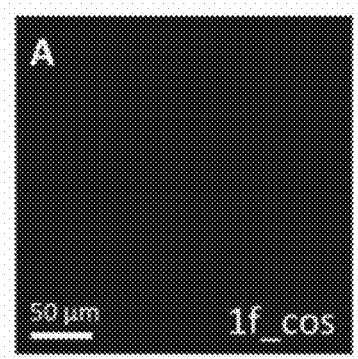
FIG. 5(a) illustrates an image measured from LIA detection with 1f.
Figure 5C:
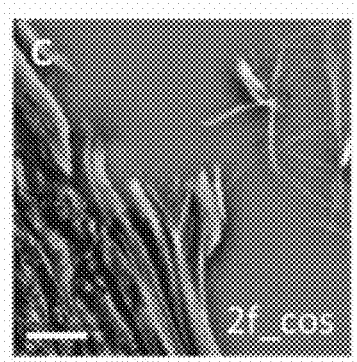
FIG. 5(c) illustrates another image measured from LIA detection with 2f.
Figure 5E:
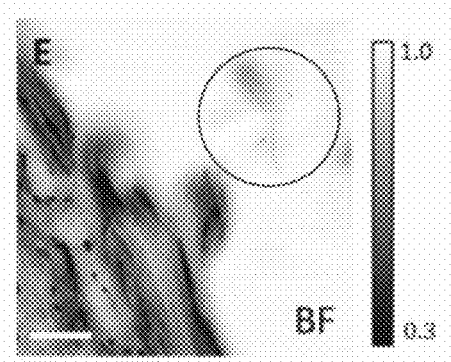
FIG. 5(e) illustrates recovered transmittance bright field image of a single FoV of mouse tail section.
Figure 5B:
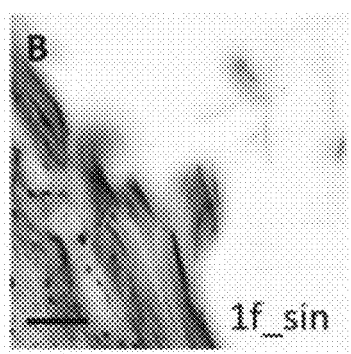
FIG. 5(b) illustrates another image measured from LIA detection with 1f.
Figure 5D:
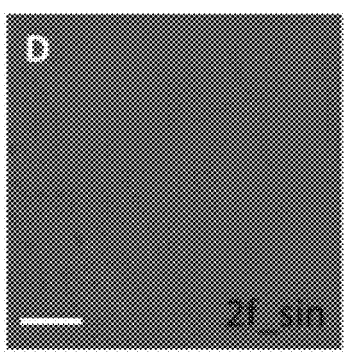
FIG. 5(d) illustrates another image measured from LIA detection with 2f.
Figure 5F:
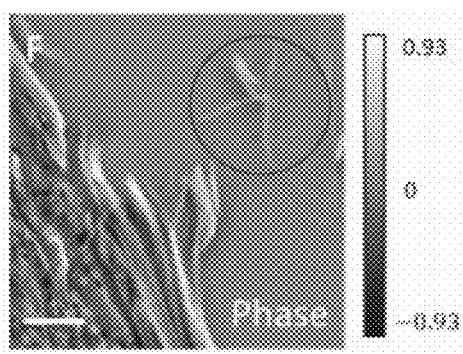
FIG. 5(f) illustrates quantitative phase contrast image of a single FoV of mouse tail section.

To demonstrate our method with rapid LIA detection, we fed both the 1f (50 kHz) and 2f (100 kHz) reference signal generated by the PEM to the LIA and acquired the ADIC images of the same FoV at two frequencies separately. The raw images (cos components and sin components) collected from 1f and 2f LIA measurements were shown in FIG. 5(A-D) for a FoV of the mouse tail section. FIGS. 5A and 5B shared the same image contrast settings, so did FIGS. 5C and 5D. It was noticed that there were almost no signal from the real part of 1f and the imaginary part of 2f, which agreed with the predictions from Eq. (6). The transmittance bright field image (FIG. 5E) and quantitative phase contrast image (FIG. 5F) were calculated using Eq. (7)-(9). Similarities were obvious between the transmittance bright field image and imaginary part of 1f LIA detection, as well as between the quantitative phase contrast image and real part of 2f LIA detection. In fact, according to Eq. (7) and (8), the imaginary image from 1f and real image from 2f can be treated as bright field image and phase contrast image directly when the transmittance from sample are relatively high and the phase shifts are relatively small. It can also be seen that the quantitative phase contrast image revealed more detailed structures and exhibited higher contrast for those areas with higher transmittance, such as the fibrils shown in the circle in FIGS. 5E and 5F.

Figures 6A, 6B, 6C, 6D:
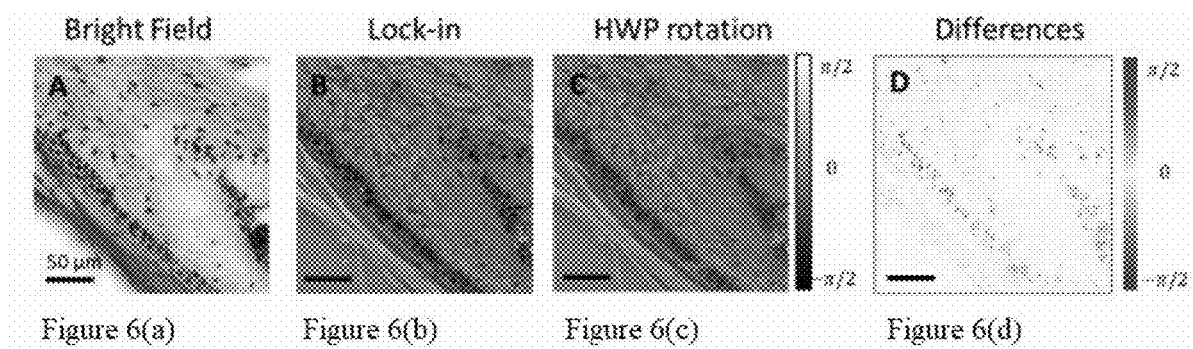
FIG. 6(a) illustrates a phase contrast image recovered from HQP rotation method and/or LIA detection of a single FoV of a mouse tail section.
FIG. 6(b) illustrates another phase contrast image recovered from HQP rotation method and/or LIA detection of a single FoV of a mouse tail section.
FIG. 6(c) illustrates another phase contrast image recovered from HQP rotation method and/or LIA detection of a single FoV of a mouse tail section.
FIG. 6(d) illustrates another phase contrast image recovered from HQP rotation method and/or LIA detection of a single FoV of a mouse tail section.
Figures 6E, 6F, 6G, 6H:
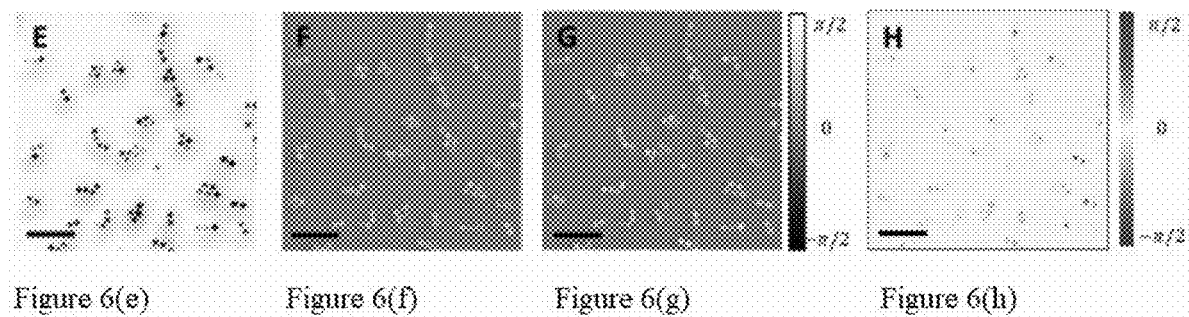
FIG. 6(e) illustrates a phase contrast image recovered from HQP rotation method and/or LIA detection of 8 µm silica beads.
FIG. 6(f) illustrates another phase contrast image recovered from HQP rotation method and/or LIA detection of 8 µm silica beads.
FIG. 6(g) illustrates another phase contrast image recovered from HQP rotation method and/or LIA detection of 8 µm silica beads.
FIG. 6(h) illustrates another phase contrast image recovered from HQP rotation method and/or LIA detection of 8 µm silica beads.

The agreement between the two QPI strategies applied to the ADIC microscopy, HWP rotation and LIA detection were tested by imaging the same FoV of a mouse tail section and dispersed 8 μm silica beads shown as FIG. 6. The transmittance bright field images (FIG. 6A through 6E) were recovered by nonlinear fitting through the HWP rotation strategy. To compare the retrieved quantitative phase contrast images with different approaches (FIGS. 6B&6C, FIGS. 6F&6G), same image contrast settings were applied. Great agreement between the retrieved results from the two strategies provides cross-validation of both approaches. The differences in phase images obtained from the two strategies were shown in FIGS. 6D and 6E. It can be seen that most differences between the two methods arise at the pixels with larger absolute phase shift values near $\pm\pi/2$. Possible reasons were that phase difference were recovered through inverse tangent in LIA method, which has higher inaccuracy for values near $\pm\pi/2$.

Figures 7A, 7B:
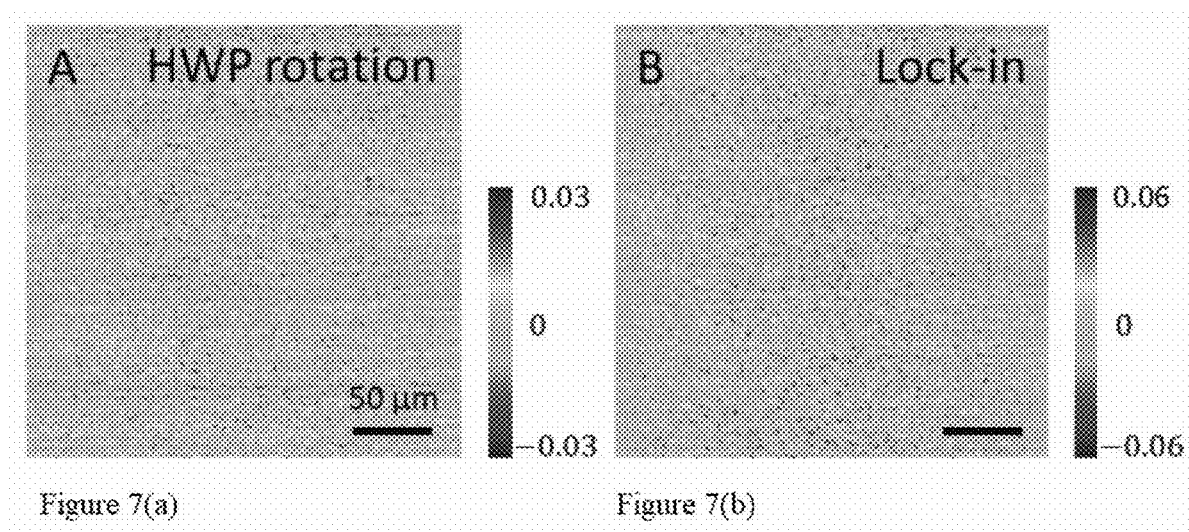
FIG. 7(a) illustrates a quantitative phase contrast image of background recovered from the HWP rotation.
FIG. 7(b) illustrates a quantitative phase contrast image of background recovered from the LIA detection.

Due to the different equations used for quantitative phase calculation, the recovered phase ranged in $[-,\pi)$ for HWP rotation strategy and $(-\pi/2, \pi/2)$ for LIA detection strategy separately, as discussed in the above paragraphs. The limits of detection (LoD) for the two strategies of ADIC microscopy were provided by retrieving quantitative phase contrast images of background without samples as shown in [FIG. 7A, B]. The calculated LoDs were 0.021 rad (3σ) for HWP rotation strategy and 0.039 rad (3σ) for LIA detection strategy separately. In the case of a thin film (reflective index as 1.7) measured using ADIC microscopy, the smallest thickness that could be determined with the two strategy are 2.5 nm and 4.7 nm. Strips can be seen in the recovered images from both strategies corresponding to the electronic noise from the sample scanning system. The self-calibration of the nonlinear fit can partially lower 1/f noise from the long require time for HWP rotation strategy (about 10 min for a whole set of 90 degree rotation with 6 degree intervals). On the other side, the pixel-by-pixel nonlinear fitting lead to time consuming data analysis process. However, due to the limitation of the LIA that used in this experiment, images from 1f and 2f were collected separately with different reference signals in. That combined with the relative short integration time (30 μs for three periods) lead to relatively higher LoD from LIA detection. This shortcut can be overcome if new series of LIA could be used to demodulate signals at 1f and $2f$ simultaneously with longer integration time.

Due to the different recovered phase ranged for HWP rotation and LIA detection strategies, QPI images recovered from the two strategies showed different phase wrapping influences. FIG. 8 shows the comparison between QPI images retrieved from the two strategies for the same FoV of 8 μm silica beads in nail polish. The color map was set as $(-\pi/2, \pi/2)$ for better contrast. Compared with HWP rotation strategy (FIG. 8A), more black holes existed in the center of the silica beads imaged with LIA detection (FIG. 8B). When zoom in and plot the phase shift along the cross of one bead (FIG. 8C), phase shift values higher than $\pi/2$ can be seen from the central part of the silica bead retrieve from HWP rotation strategy, while keeps negative for LIA detection. This phase wrapping is predictable from the theoretical equation. After manually add $\pi/2$ to the negative value in LIA detection due to the periodicity of inverse tangent, the two plots showed great agreements as shown in FIG. 8D.

Example 1

A method for phase contrasting, wherein the method includes converting a purely polarized light of an incident light into two orthogonal components, wherein the two orthogonal components includes a first purely polarized divergent component and a second purely polarized convergent component. The first purely polarized divergent component is orthogonal to the second purely polarized convergent component. The method additionally includes focusing each of the first purely polarized divergent component and the second purely polarized convergent component into a focal plane, thereby producing axially offset two foci planes. Furthermore, the method includes placing a first portion of a sample at one focus plane of the two foci planes. Additionally, the method includes combining a phase altered purely polarized light component with a phase unaltered purely polarized light component to form a second purely polarized light, wherein the phase altered purely polarized light component includes a first phase shifted divergent purely polarized light component or a second phase shifted convergent purely polarized light component. The first phase shifted divergent purely polarized light component is orthogonal to the second phase shifted convergent purely polarized light component. Moreover, the method includes detecting the second purely polarized light by a channeled detector. Furthermore, the method includes calculating a first phase change of the first portion of the sample from the second purely polarized light.

Next, the method includes placing a second portion of the sample at the one focus plane of the two foci planes. Additionally, the method includes combining a second phase altered purely polarized light component with a second phase unaltered purely polarized light component to form a third purely polarized light, wherein the second phase altered purely polarized light component includes a third phase shifted divergent purely polarized light or a fourth phase shifted convergent purely polarized light. The third phase shifted divergent purely polarized light is orthogonal to the fourth phase shifted convergent purely polarized light. Moreover, the method includes detecting the third purely polarized light by the channeled detector. Further, the method includes calculating a second phase change of the second portion of the sample from the third purely polarized light.

In accordance with the above example, the incident light is emitted from a laser device, an LED, or any light source. The converting, and the combining is performed by a micro-retarder array. The focusing is performed by an optical device. The channeled detector comprises a single channel photo-diode, a single channel photodiode connected to a lock-in amplifier, a lock-in camera, or a camera. The micro-retarder array includes a patterned substrate, wherein the substrate includes a liquid crystal polymer. The liquid crystal polymer comprises a half-wave retardance material. The patterned substrate comprises a plurality of concentric circles. Each concentric circle of the plurality of concentric circles is a different orientation of a fast axis of a half-wave retardance material.

Example 2

A system including a first micro-retarder array, wherein the first micro-retarder array is configured to convert a purely polarized light of an incident light into two components. The system additionally includes an optical device, wherein the optical device is configured to collimate the two components to two foci planes. Moreover, the system includes a second micro-retarder array, wherein the second micro-retarder array is configured to combine a set of two components of the incident light, thereby producing a second purely polarized light. Further the system includes a detector, wherein the detector is configured to receive the second purely polarized light. The system includes a light source and a half-wave plate. The light source is configured to transmit the incident light to the half-wave plate. The half-wave plate is configured to produce the purely polarized light from the incident light. Additionally, the system includes a photoelastic modulator and a quarter-wave plate, wherein the photoelastic modulator, the half-wave plate, and the quarter-wave plate are configured to produce the purely polarized light from the incident light. The system also includes a second optical device, wherein the second optical device is configured to collimate the set of two components of the incident light to the second micro-retarder array.

Upon operation, a sample is placed at a foci plane of the two foci planes. A component of the set of two components of the incident light is altered. The purely polarized light includes a linearly polarized light. And, the two orthogonal components comprises a divergent right circular polarized light component and a converging left circular polarized light component.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, design, machine, manufacture, and composition of matter, means, methods and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

The invention claimed is:

1. A method for phase contrasting, wherein the method comprises:
    converting a purely polarized light of an incident light into two orthogonal components, wherein the two orthogonal components comprises: a first purely polarized divergent component and a second purely polarized convergent component, wherein the first purely polarized divergent component is orthogonal to the second purely polarized convergent component;
    focusing each of the first purely polarized divergent component and the second purely polarized convergent component into a focal plane, thereby producing axially offset two foci planes,
    placing a first portion of a sample at one focus plane of the two foci planes;
    combining a phase altered purely polarized light component with a phase unaltered purely polarized light component to form a second purely polarized light, wherein the phase altered purely polarized light component comprises a first phase shifted divergent purely polarized light component or a second phase shifted convergent purely polarized light component, wherein the first phase shifted divergent purely polarized light component is orthogonal to the second phase shifted convergent purely polarized light component;
    detecting the second purely polarized light by a channeled detector; and
    calculating a first phase change of the first portion of the sample from the second purely polarized light.

2. The method of claim 1, further comprising:
    placing a second portion of the sample at the one focus plane of the two foci planes;
    combining a second phase altered purely polarized light component with a second phase unaltered purely polarized light component to form a third purely polarized light, wherein the second phase altered purely polarized light component comprises a third phase shifted divergent purely polarized light or a fourth phase shifted convergent purely polarized light, wherein the third phase shifted divergent purely polarized light is orthogonal to the fourth phase shifted convergent purely polarized light;
    detecting the third purely polarized light by the channeled detector; and
    calculating a second phase change of the second portion of the sample from the third purely polarized light.

3. The method of claim 2, wherein the channeled detector comprises a single channel photo-diode, a lock-in amplifier, a lock-in camera, or a camera.

4. The method of claim 1, wherein the incident light is emitted from a laser device, an LED, or any light source.

5. The method of claim 1, wherein the converting, and the combining is performed by a micro-retarder array.

6. The method of claim 5, wherein the combining is performed by a micro-retarder array.

7. The method of claim 6, wherein the micro-retarder array comprises:
    a patterned substrate, wherein the substrate comprises a liquid crystal polymer.

8. The method of claim 7, wherein the liquid crystal polymer comprises a half-wave retardance material.

9. The method of claim 7, wherein the patterned substrate comprises a plurality of concentric circles.

10. The method of claim 9, wherein each concentric circle of the plurality of concentric circles is a different orientation of a fast axis of a half-wave retardance material.

11. The method of claim 1, wherein the focusing is performed by an optical device.

12. The method of claim 1, wherein the channeled detector comprises a single channel photo-diode, a single channel photodiode connected to a lock-in amplifier, a lock-in camera, or a camera.

13. The method of claim 1, wherein the purely polarized light comprises a linearly polarized light.

14. The method of claim 13, wherein the two orthogonal components comprises a divergent right circular polarized light component and a converging left circular polarized light component.

15. A system comprising:
    a first micro-retarder array, wherein the first micro-retarder array is configured to convert a purely polarized light of an incident light into two components;
    an optical device, wherein the optical device is configured to collimate the two components to two foci planes that are axially offset;
    a second micro-retarder array, wherein the second micro-retarder array is configured to combine a set of two components of the incident light, thereby producing a second purely polarized light; and
    a detector, wherein the detector is configured to receive the second purely polarized light.

16. The system of claim 15, further comprising:
    a light source; and
    a half-wave plate,
    wherein the light source is configured to transmit the incident light to the half-wave plate;
    the half-wave plate is configured to produce the purely polarized light from the incident light.

17. The system of claim 16, further comprising:
    a photoelastic modulator; and
    a quarter-wave plate, wherein the photoelastic modulator, the half-wave plate, and the quarter-wave plate are configured to produce the purely polarized light from the incident light.

18. The system of claim 15, further comprising:
a second optical device, wherein the second optical device is configured to collimate the set of two components of the incident light to the second micro-retarder array.

19. The system of claim 15, further comprising a sample, wherein the sample is placed at a foci plane of the two foci planes.

20. The system of claim 15, wherein a component of the set of two components of the incident light is altered.

* * * * *